United States Patent Office 2,723,275
Patented Nov. 8, 1955

2,723,275

3,5-DIUREIDO-1,2,4-TRIAZOLE

Donald W. Kaiser, Hamden, and Grace A. Peters, Stamford, Conn., assignors to American Cyanamid Company, New York, N. Y., a corporation of Maine No Drawing. Original application March 8, 1954, Serial No. 414,868. Divided and this application May 31, 1955, Serial No. 512,316

2 Claims. (Cl. 260—308)

The present invention relates to a new ureidotriazole and a method of preparing the compound. This application is a division of our copending application Serial No. 414,868, filed March 8, 1954.

The new compound is a diureidotriazole which conforms to the formula

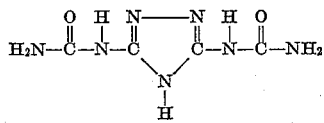

The diureidotriazole, namely the 3,5-diureido-1,2,4-triazole, may be readily prepared by reacting guanazole with an alkali metal cyanate in an aqueous mineral acid medium maintained at a temperature within the range of from about 10° to 60° C., and preferably in the range of 20° to 40° C. Mineral acids which may be employed in this process are hydrochloric, sulfuric, nitric and phosphoric acid.

The guanazole compound utilized in the preparation of the ureidotriazole of this invention may be prepared according to methods disclosed in U. S. Patent No. 2,648,671.

The following example further illustrates the invention:

Example

A solution of 16 g. (0.2 mole) of potassium cyanate in 50 cc. of water was added to a solution 10 g. (0.1 mole) of guanazole and 17 cc. (0.2 mole) of concentrated hydrochloric acid in 100 cc. of water at room temperature. The reaction mixture was stirred for a period of two hours and then filtered to remove the precipitated 3,5-diureido-1,2,4-triazole. 18 g. (97% yield) of the crude product was obtained. After recrystallization from a mixture of water and 2-ethoxyethanol (95 parts of water and 5 parts of 2-ethoxyethanol by volume), the colorless crystalline product melted at 240° C. with decomposition.

The ureidotriazole of the present invention has valuable and characteristic properties which make it especially suitable for use in industry, for example, resinous condensarion products formed by condensing the diureidotriazole with low molecular weight aliphatic aldehydes such as formaldehyde, paraldehyde, acetaldehyde and butyraldehyde, are especially suitable for use in the manufacture of molded and laminated articles, and for use in coating and adhesive applications. These resinous condensation products are particularly adapted for the manufacture of molded articles which are distinguished by a high degree of resistance toward water and light, and by good electrical insulating power.

While the invention has been described with particular reference to specific embodiments, it is to be understood that it is not to be limited thereto but is to be construed broadly and restricted solely by the scope of the appended claims.

We claim:
1. 3,5-diureido-1,2,4-triazole.
2. The method of preparing 3,5-diureido-1,2,4-triazole which comprises reacting guanazole with an alkali metal cyanate in an aqueous mineral acid medium at a temperature in the range of about 10°–60° C.

No references cited.